(12) United States Patent
Natsui et al.

(10) Patent No.: US 8,229,652 B2
(45) Date of Patent: Jul. 24, 2012

(54) CONTROL APPARATUS FOR CYLINDER INJECTION TYPE INTERNAL COMBUSTION ENGINE

(75) Inventors: Hiroyuki Natsui, Hino (JP); Yoshihiro Sukegawa, Hitachi (JP); Yusuke Kihara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 12/194,929

(22) Filed: Aug. 20, 2008

(65) Prior Publication Data

US 2009/0070007 A1   Mar. 12, 2009

(30) Foreign Application Priority Data

Sep. 10, 2007   (JP) ................................. 2007-233534

(51) Int. Cl.
*B60T 7/12* (2006.01)
*G06F 17/00* (2006.01)

(52) U.S. Cl. ...................... 701/105; 701/103; 123/90.15

(58) Field of Classification Search .................. 701/103, 701/105; 123/90.15, 179.1, 179.16, 179.18
See application file for complete search history.

(56) References Cited

U.S. PATENT DOCUMENTS

| | | | | |
|---|---|---|---|---|
| 5,228,422 A * | 7/1993 | Wakeman | | 123/432 |
| 5,233,948 A * | 8/1993 | Boggs et al. | | 123/64 |
| 6,394,051 B1 * | 5/2002 | Filipe et al. | | 123/90.15 |
| 6,637,386 B2 * | 10/2003 | Murata et al. | | 123/90.15 |
| 6,679,206 B2 * | 1/2004 | Takagi | | 123/90.15 |
| 6,681,741 B2 * | 1/2004 | Majima et al. | | 123/399 |
| 6,691,506 B2 * | 2/2004 | Shimizu | | 60/284 |
| 6,810,844 B2 * | 11/2004 | Sellnau | | 123/90.16 |
| 6,904,881 B2 * | 6/2005 | Hirowatari et al. | | 123/90.15 |
| 7,011,054 B2 * | 3/2006 | Hirowatari et al. | | 123/90.15 |
| 7,021,277 B2 * | 4/2006 | Kuo et al. | | 123/299 |
| 7,334,547 B2 * | 2/2008 | Hiraya et al. | | 123/48 R |
| 7,360,523 B2 * | 4/2008 | Sloane et al. | | 123/305 |
| 7,401,579 B2 * | 7/2008 | Murase et al. | | 123/90.15 |
| 7,520,261 B2 * | 4/2009 | Saruwatari et al. | | 123/305 |
| 7,603,223 B2 * | 10/2009 | Moriya | | 701/103 |
| 2003/0061803 A1 * | 4/2003 | Iihoshi et al. | | 60/285 |
| 2007/0215095 A1 * | 9/2007 | Kakuya et al. | | 123/295 |
| 2009/0063021 A1 * | 3/2009 | Natsui et al. | | 701/105 |

FOREIGN PATENT DOCUMENTS

| | | |
|---|---|---|
| JP | 2000-8915 A | 1/2000 |
| JP | 2002-242710 A | 8/2002 |
| JP | 2004316449 A  * | 11/2004 |
| WO | WO 2006/095515 A1 | 9/2006 |

OTHER PUBLICATIONS

European Search Report dated Dec. 14, 2010 (six—6—pages).

* cited by examiner

*Primary Examiner* — Mahmoud Gimie
*Assistant Examiner* — David Hamaoui
(74) *Attorney, Agent, or Firm* — Crowell & Moring LLP (57) ABSTRACT

A control apparatus for a cylinder injection type internal combustion engine wherein the variable lift mechanism lessens the lift of the intake valve so as to set the time of opening the intake valve in a retarded angle position, in cold starting of the engine. The time of closing the exhaust valve is accordingly set in a retarded angle position.

8 Claims, 11 Drawing Sheets

CONTROL APPARATUS FOR CYLINDER INJECTION TYPE INTERNAL COMBUSTION ENGINE

BACKGROUND OF THE INVENTION

The present invention relates to the reduction of noxious exhaust gas components discharged at the time of starting a cylinder injection type internal combustion engine in which fuel is injected directly into the combustion chamber by means of the fuel injectors.

Hydrocarbon (HC) as unburned fuel is one of the noxious exhaust gas components discharged at the time of starting a cylinder injection type internal combustion engine. During the warming-up period of an internal combustion engine which follows the start-up of the engine, the three-way catalyst for purifying the HC left as unburned fuel is not yet activated. Thus, the HC to be discharged out of the engine cannot be purified and the unpurified noxious substance is discharged into the air. It is therefore required that HC discharged from an internal combustion engine should be reduced at the time of starting the engine. The cause of HC being discharged out of a cylinder injection type internal combustion engine in cold starting, may be ascribed to unburned fuel adhering to the internal surface of the cylinder and/or the top surface of the piston head. Namely, in cold state of the cylinder injection type internal combustion engine, the direct injection of fuel into the cylinder may causes the adhesion of fuel onto the surface of the cylinder or piston head. While the engine is still cool, the adhering fuel cannot be vaporized and may be discharged as unburned fuel that is noxious HC.

JP-A-2000-8915 discloses a technique which takes the above described situation into consideration. According to the technique, the inflow of air sucked into the combustion chamber is enhanced and the air flow strong enough is created in the chamber, by controlling the timing of opening the intake valves and the timing of fuel injection and further by reducing the lift amount (valve opening) of the intake valves, so that the adhesion of fuel onto the surface of the cylinder or piston head can be suppressed with the result that the amount of HC discharged out of the engine is reduced.

SUMMARY OF THE INVENTION

In such a case as disclosed in JP-A-2000-8915, where a strong air flow is created in the combustion chamber by reducing the lift amount of the intake valves and by retarding the time of opening the intake valves, it is indeed possible to suppress the adhesion of fuel onto the surface of the cylinder, but still impossible to suppress the amount of HC discharged out of the internal combustion engine since the flow of intake air toward the piston head becomes strong so that the fuel adhesion to the top surface of the piston head increases.

One object of the present invention is to reduce the amount of HC discharged out of an internal combustion engine during the so-called fast idle period for which the engine and the catalyst are warmed up in cold starting. Another object of this invention is to realize the retardation of the ignition timing by stabilizing the fuel combustion during the fast idle period and then to realize the early activation of catalyst.

According to one aspect of this invention which has been made to solve the above mentioned problems, the cylinder injection type internal combustion engine in which fuel is directly supplied into the combustion chamber by means of a fuel injection apparatus installed in the vicinity of the intake valve (i.e. side injection position) is controlled in a manner as follows.

Namely, the fuel injection apparatus is so controlled as to inject fuel on the intake stroke during the fast idle period of the cylinder injection type internal combustion engine; the lift of the intake valve is lessened as compared with that used in the case of heavy load; the time of opening the intake valve is so set on the retarded angle side as to be close to the fuel injection timing; the time of closing the exhaust valve is set on the retarded angle side with respect to the top dead center on the intake stroke; and the burned gas remaining in the exhaust pipe is sucked back into the combustion chamber.

According to another aspect of this invention which has been made to solve the above mentioned problems, the cylinder injection type internal combustion engine in which fuel is directly supplied into the combustion chamber by means of a fuel injection apparatus installed in the vicinity of the intake valve (i.e. side injection position) is controlled in a manner as follows.

Namely, the fuel injection apparatus is so controlled as to inject fuel on the intake stroke during the fast idle period of the cylinder injection type internal combustion engine; the lift of the intake valve is lessened as compared with that used in the case of heavy load; the time of opening the intake valve is so set as to be close to the fuel injection timing; the time of closing the exhaust valve is set on the advanced angle side with respect to the top dead center on the intake stroke; and the burned gas is confined within the combustion chamber.

According to this invention, the internal of the combustion chamber can be kept at high temperatures by sucking back the burned gas into the combustion chamber through the retardation of the exhaust valve closing time. Accordingly, even when there is toward the piston head the strong flow of the intake air caused as a result of lessening the lift of the intake valve and retarding the intake valve opening time, the vaporization of fuel is promoted in the high-temperature combustion chamber so that the adhesion of fuel onto the top surface of the piston head can be suppressed. This enables the amount of HC discharged during the fast idle period to be reduced. Further, the combustion of fuel can be stabilized since the vaporization of fuel is promoted by the strong flow of the intake air caused as a result of lessening the lift of the intake valve and retarding the intake valve opening time. Consequently, the degree of retardation of the ignition timing can be made large to elevate the temperature of the exhaust gas so that the early activation of the catalyst can be realized. Thus, emission control performance in the case of the cold start of engine can be remarkably improved.

Other objects, features and advantages of the invention will become apparent from the following description of the embodiments of the invention taken in conjunction with the accompanying drawings.

DESCRIPTION OF THE EMBODIMENTS

Figure 2:
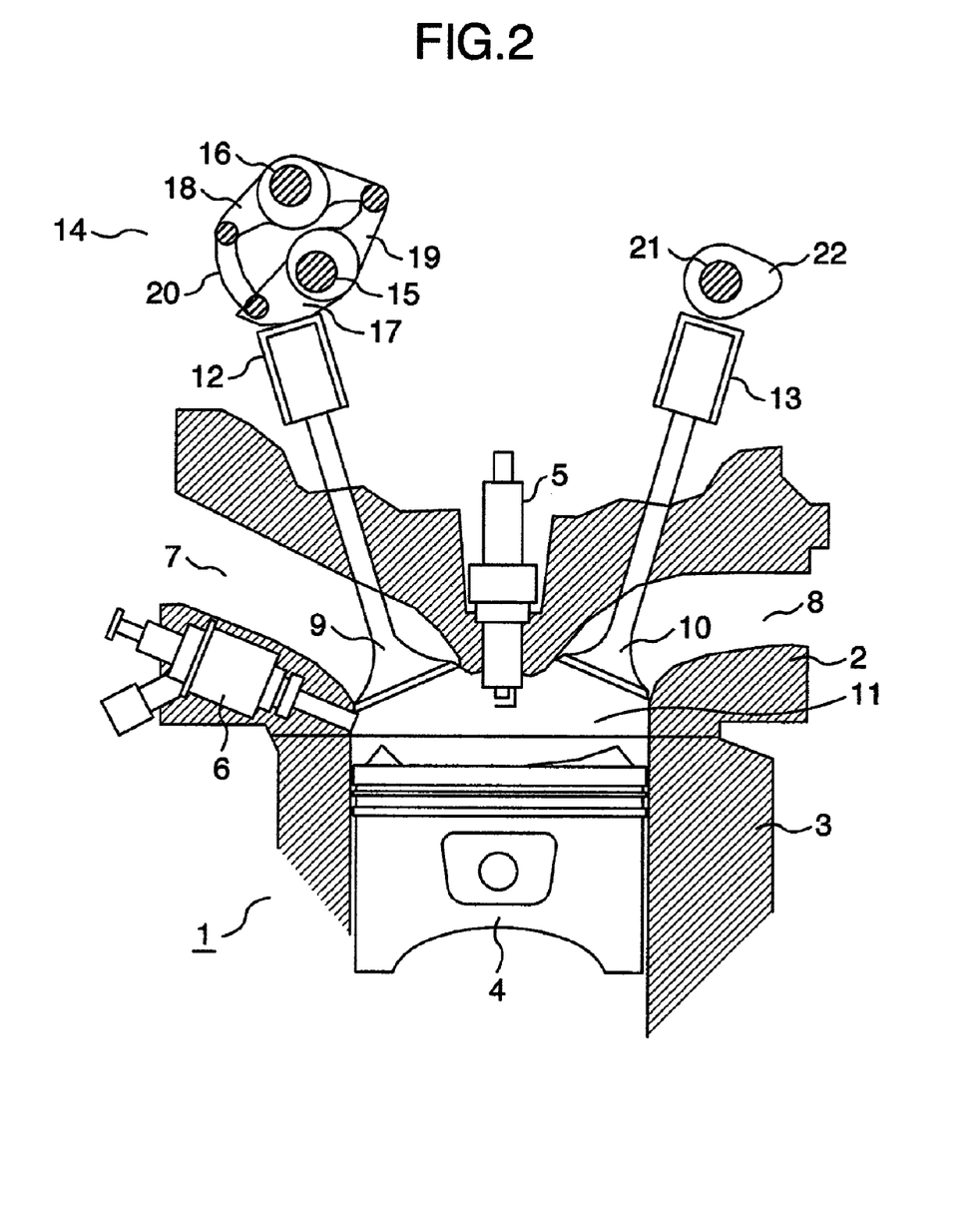
FIG. 2 shows in cross section an example of the cylinder injection type internal combustion engine.

FIG. 2 shows in cross section a cylinder injection type internal combustion engine to which this invention is to be applied.

The cylinder injection type internal combustion engine 1 comprises a cylinder head 2, a cylinder block 3, and a piston 4 which reciprocates in the cylinder block 3. A spark plug 5 is situated in the center of a combustion chamber 11 enclosed by the cylinder head 2, the cylinder block 3, and the piston 4. A fuel injector 6 for directly injecting fuel into the combustion chamber 11 is located between two intake valves 9 provided in the combustion chamber 11.

An intake pipe 7 and an exhaust pipe 8, both communicating with the combustion chamber 11, are formed in the cylinder head 2, and the fluid passages from the intake pipe 7 to the combustion chamber 11 and from the combustion chamber 11 to the exhaust pipe 8 are open or closed by means of the intake valve 9 and the exhaust valve 10, respectively.

The intake valve 9 is driven by pushing down an intake valve lifter 12 attached to the top portion of the stem of the intake valve 9 by means of a rocking cam 17.

The drive section for the intake valve 9 is furnished with a variable lift mechanism 14 which will be described in detail later, and the variable lift mechanism 14 can continuously vary the lift amount and the operating angle, of the intake valve 9.

The variable lift mechanism 14 consists of a drive shaft 15, a control shaft 16, a rocking cam 17, a rocker arm 18, a link arm 19 and a link member 20. The rotation of the drive shaft 15 causes the rocker arm 18 to wing by means of the link arm 19 so that rocking motion is created by means of the link member 20.

A control cam is fixedly attached to the control shaft 16 in an eccentric manner, and therefore the rotation of the control cam changes the position of the fulcrum point in the rocking motion of the rocker arm 18, thereby varying the degree of rocking of the rocking cam 17.

Figure 3:
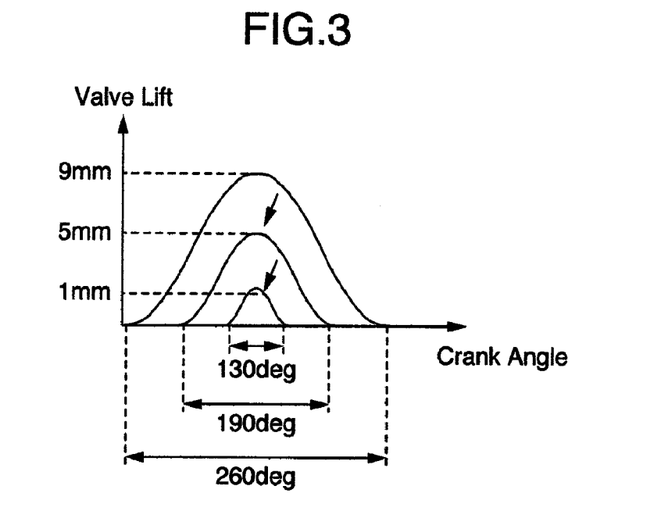
FIG. 3 shows valve lift curves in the case of valve control by the variable valve lift mechanism.

FIG. 3 graphically shows an example of the relationship between lift amount and crank angle, in which is illustrated how the valve lift amount of the intake valve 9 adjusted by the variable lift mechanism 14 changes in response to the change of the crank angle.

According to the mode in the practice of this invention, a variable valve timing mechanism, well-known and not shown in the attached drawings, is further provided to be able to vary the timing of opening and closing of the intake valve 9 and the exhaust valve 10.

The exhaust valve 10 is lifted by pushing an exhaust valve lifter 13 attached to the top portion of the stem of the exhaust valve 10 by means of an exhaust cam 22. The exhaust cam 22 is fixedly attached to an exhaust cam shaft 21.

Figure 4:
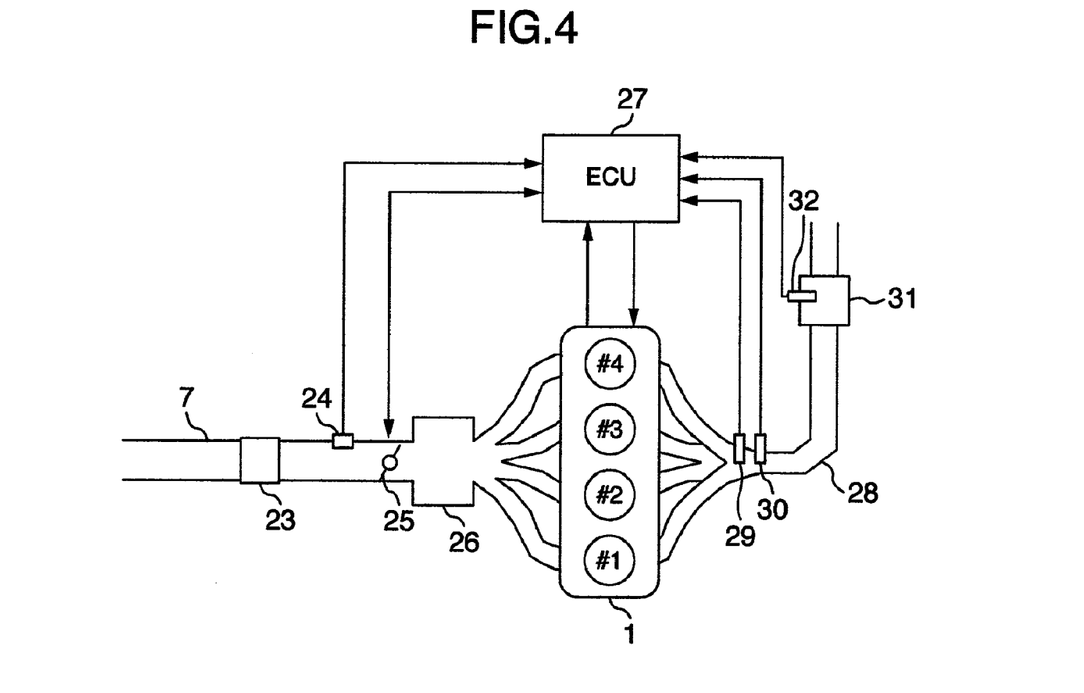
FIG. 4 schematically shows the structure of a 4-cylinder internal combustion engine of cylinder injection type.

FIG. 4 schematically shows the structure of a 4-cylinder internal combustion engine of cylinder injection type.

The intake pipe 7 is provided with an air cleaner 23 for purifying the intake air, an air flow sensor 24 for measuring the amount of the intake air flow, an electronically controlled throttle 25 for controlling the intake air flow, and a surge tank 26 for suppressing the pulsating change in the pressure of the intake air in the intake pipe 7.

An air-fuel ratio sensor 29 is installed at the location in an exhaust pipe 28 where the exhaust gas passages from the #1, #2, #3 and #4 cylinders merge. An exhaust gas temperature sensor 30 is installed at the location on the exhaust pipe 28 where all the exhaust gas passages from the #1~#4 cylinders merge. A catalytic converter 31 for purifying exhaust gas and a catalyst temperature sensor 32 for measuring the temperature of the catalytic converter 31 are installed downstream of the locations along the exhaust pipe 28.

An engine control unit (hereafter referred to as ECU) 27 is a well-known microcomputer consisting mainly of a microprocessor (CPU), a read-only memory (ROM), a random access memory (RAM), and an input/output port, all being connected with one another via bidirectional buses.

Figure 5:
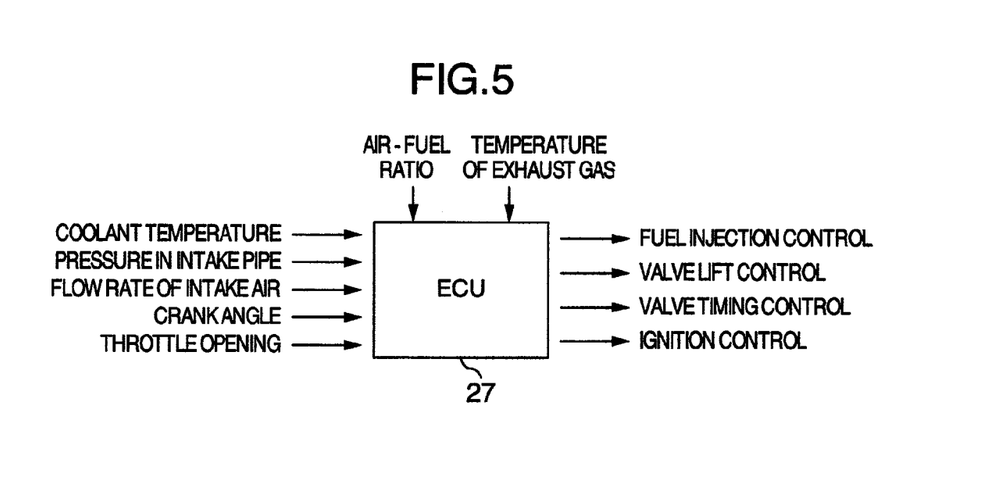
FIG. 5 shows the inputs and the outputs of the engine control unit (ECU) for use with the cylinder injection type internal combustion engine according to this invention.

The ECU 27, as apparent from FIG. 5, are electrically connected with a crank angle sensor, an intake pipe pressure sensor, the air flow sensor 24, a throttle opening sensor, a coolant temperature sensor, and the air-fuel ratio sensor 29, all sensors being installed on the cylinder injection type internal combustion engine 1. These sensors serve to determine the operating conditions of the engine 1.

The ECU 27, in order to control the lift amount of the intake valve 9, is connected with a sensor for detecting the rotational angle (i.e. angular position) of the control shaft 16 so that a drive motor (not shown) for controlling the rotational angle of the control shaft 16 is controlled.

The ECU 27 is also connected with the spark plug 5, the fuel injector 6 and the variable lift mechanism 14 in order to control fuel injection, ignition timing and valve motions in accordance with the operating conditions of the engine.

The structure of the cylinder injection type internal combustion engine 1 according to the mode in the practice of this invention is as described above. In what follows will be described the effect on the reduction of HC discharged during the so-called fast idle that lasts from the cold-start of the engine till the end of the catalyst warming-up operation, and also on the early catalyst warming-up.

Figure 1:
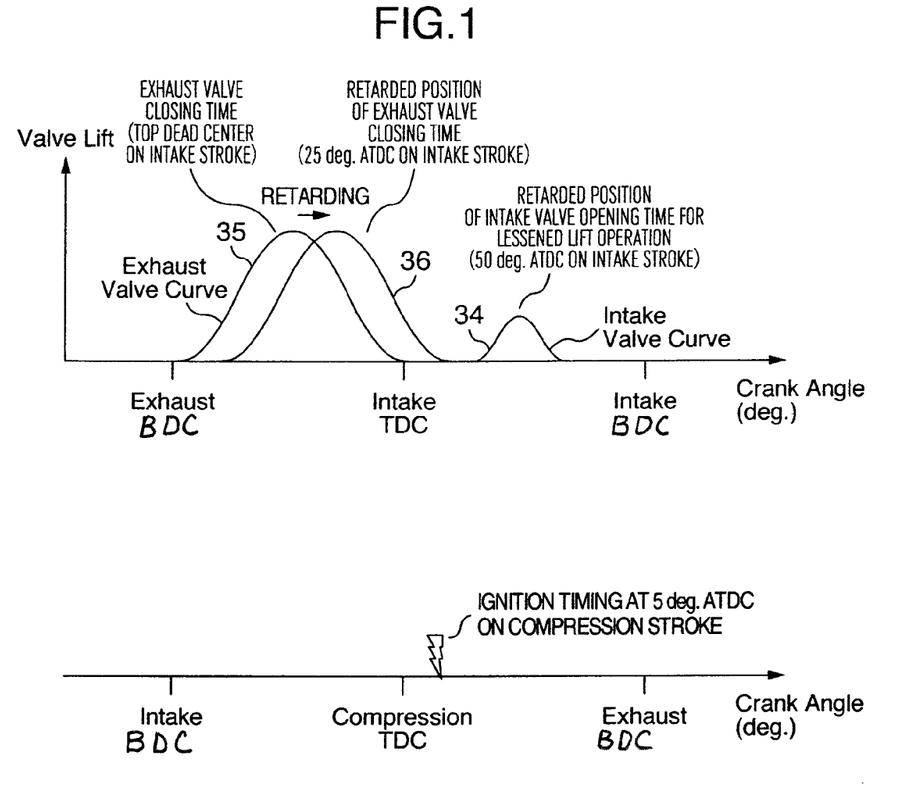
FIG. 1 graphically illustrates how the intake valve and the exhaust valve are controlled when the internal combustion engine is cold-started.
Figure 6:
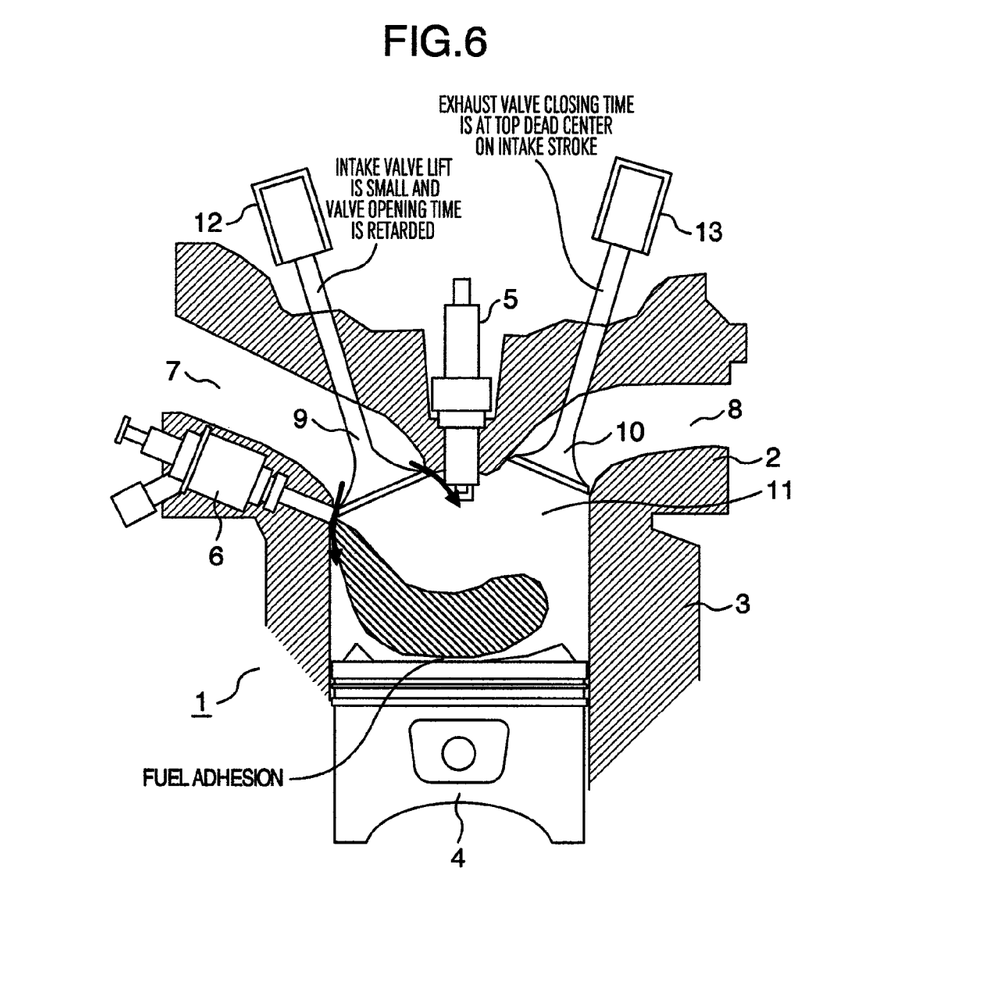
FIG. 6 shows in cross section a cylinder injection type internal combustion engine in order to explain the behavior of fuel in the cylinder in case where the intake valve lift is lessened, the intake valve opening time is retarded, and the exhaust valve closing time is set at the top dead center on the intake stroke.

FIG. 6 shows in cross section the cylinder injection type internal combustion engine 1 in its operating state represented by the intake valve curve 34 and the exhaust valve curve 35 in FIG. 1. Under this condition, the cross sectional area across which intake air flows passing the intake valve is small as compared with that in the normal case where the valve lift is large. Accordingly, the velocity of the air flow passing the valve opening becomes high. The time of opening the intake valve 9 is set to the retarded angle side. Namely, in this embodiment, the time of opening the intake valve 9 is set to 50 degrees after top dead center on the intake stroke. Consequently, the pressure difference between the intake pipe 7 and the combustion chamber 11 becomes large before the intake valve 9 opens. Thus, when the intake valve 9 opens, the velocity of the intake air flow becomes large so that a strong air flow can be generated in the combustion chamber 11. This strong flow of intake air can change the traveling path of the injected fuel, and can therefore suppress the amount of fuel adhering to the cylinder surface. This strong flow of intake air can also promote the even blending of fuel and air so that the combustion of fuel can be stabilized.

On the other hand, the injected fuel is turned toward the piston 4 by the enhanced air flow and part of the injected fuel adheres to the top surface of the piston head. Even in the state where the fuel injection timing is retarded and the piston 4 is in the vicinity of the bottom dead center, it is hard to suppress the adhering of fuel onto the top surface of the piston head since there is a strong downflow of intake air toward the piston 4.

Figure 7:
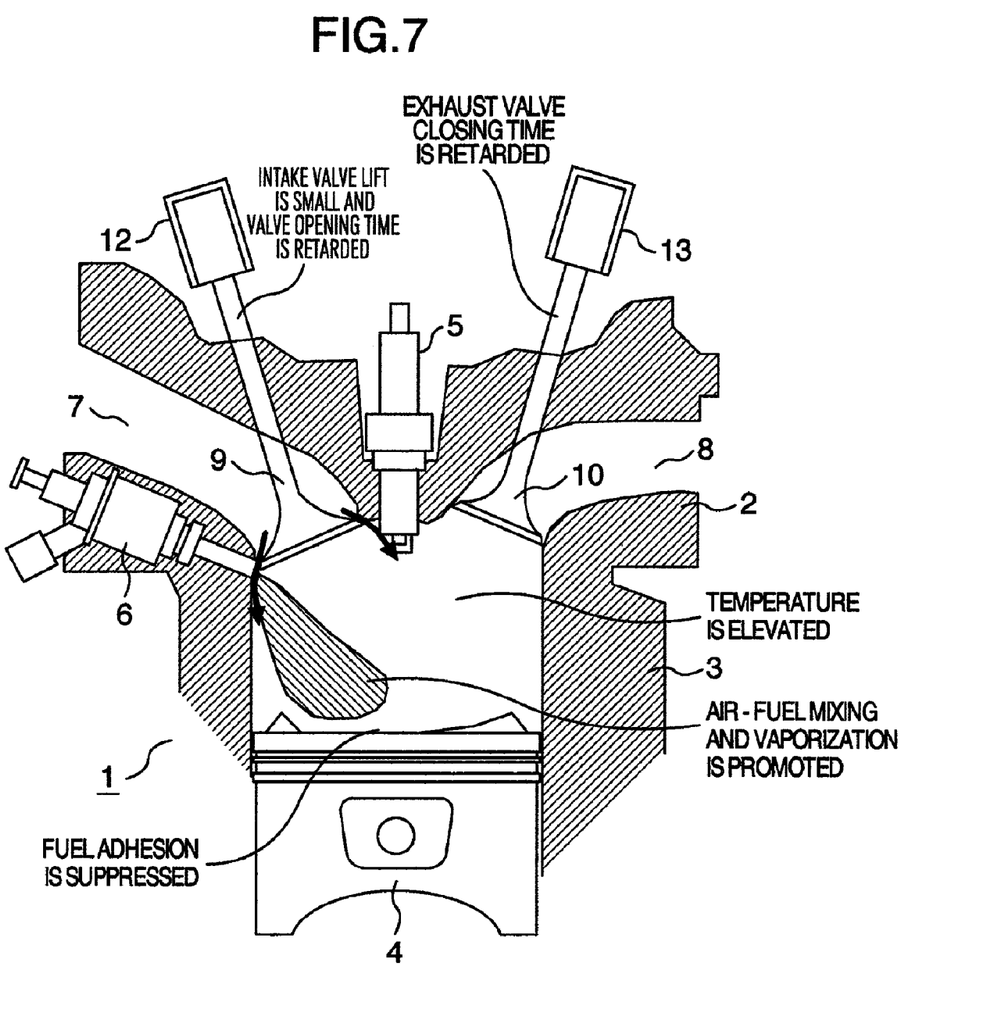
FIG. 7 shows in cross section a cylinder injection type internal combustion engine in order to explain the behavior of fuel in the cylinder in case where the intake valve lift is lessened, the intake valve opening time is retarded, and the exhaust valve closing time is retarded.

In the mode of operation shown in FIG. 7, in order to suppress the adhering of fuel onto the top surface of piston head, the time of closing the exhaust valve 10 is retarded as depicted by the curve 36 representing the exhaust valve lift in FIG. 1, that is, set to a crank angle position after the top dead center on the intake stroke. In this embodiment, the time of closing the exhaust valve 10 is set to 25 degrees after the top dead center on the intake stroke. The burned fuel gas in the combustion chamber 11 is discharged as exhaust gas into the exhaust pipe 8 by the piston 4 on the exhaust stroke. Since the exhaust valve 10 is not closed at the top dead center on the intake stroke, the once exhausted burned fuel, i.e. exhaust gas, is sucked back again as residual gas into the combustion chamber 11. At this time, the intake valve 9 is not opened since the time of opening the intake valve 9 is retarded. Consequently, only the burned fuel gas remaining in the exhaust pipe 8 is sucked back into the combustion chamber 11. Since the temperature of the residual gas sucked back into the combustion chamber 11 is high, it promotes the vaporization of the injected fuel so that the adhering of fuel onto the piston 4 can be suppressed.

The burned fuel gas still contains HC as unburned components of fuel. The oxidization of HC increases the temperature of exhaust gas and, as a result of this, the temperature of the residual gas sucked back into the combustion chamber 11 can be elevated. In order to promote the oxidization of HC contained in the burned fuel gas, it is effectual to keep the burned fuel gas at high temperatures and to cause the burned fuel gas to be agitated (mixed) enough. Such mixing results in a higher probability of HC particles contacting oxygen molecules, thus promoting the oxidization reaction.

In the operation as shown in FIG. 7, the exhaust valve 10 is so controlled as to be closed with a delay. In this situation, burned fuel gas travels back and forth between the combustion chamber 11 and the exhaust pipe 8 so that the burned fuel gas is well mixed up. Thus, the reaction of oxygen on HC can be promoted and the temperature of the residual gas led into the combustion chamber 11 can be elevated.

Figure 8:
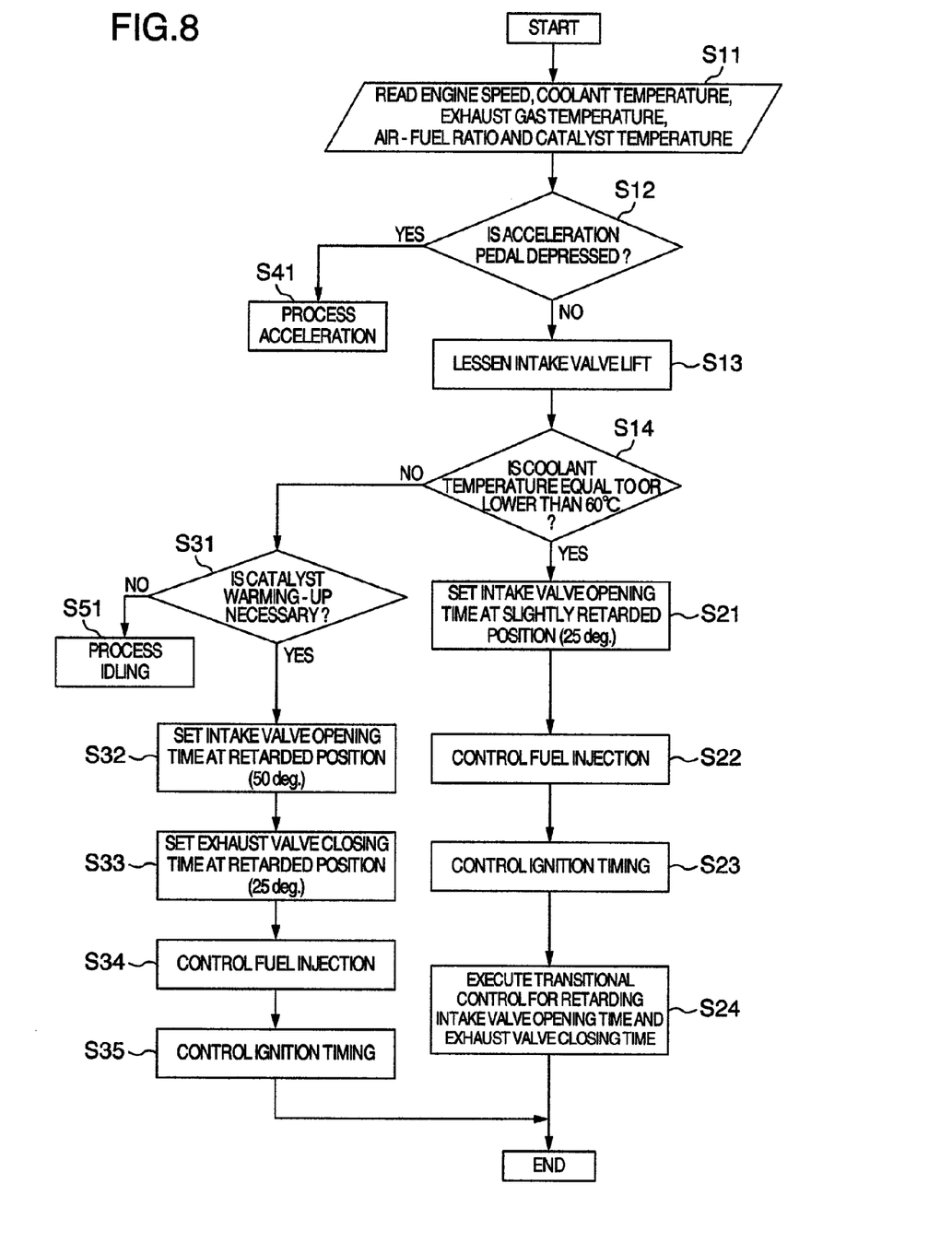
FIG. 8 is a flow chart for an example of control routine used in the case of the cold start of the engine.

Now, description will be made of the way of controlling the intake valve 9 and the exhaust valve 10 so as to reduce the amount of HC produced during the fast idle period and to realize the early catalyst warming-up. FIG. 8 is a flow chart for an example of the way of such control with a control routine as a main stream.

When the control starts, data on the engine speed, coolant temperature, exhaust gas temperature, air-fuel ratio, and catalyst temperature are read in from the respective sensors installed on the cylinder injection type internal combustion engine 1, in Step S11.

Then, the step S12 is reached, where decision is made on whether the acceleration pedal is depressed or not. When the pedal is depressed, the step S41 is reached, where an acceleration process control is executed in accordance with the extent of the pedal depression. Also, when the pedal is depressed, while the control routine including all the successive steps is being executed, the step S41 is reached, where the acceleration process control is executed in accordance with the extent of the pedal depression. When decision is made that there is no depressing of acceleration pedal in the step S12, the step S13 is reached, where control is made to lessen the lift amount of the intake valve 9. Namely, the lift amount of the intake valve 9 is set small by controlling the drive motor for controlling the rotational angle (or angular position of the control shaft 16 in such a manner that the rotational angle (or angular position) becomes the value equal to the lift amount mapped and stored in the ROM in the ECU 27. Then, the step S14 is reached, where decision is made on whether the step S21 is executed or the step S31 is executed, depending on the coolant temperature fetched in the step S11. In this embodiment, the coolant temperature for that criterion is set to 60° C.

When the coolant temperature is higher than 60° C., decision is that the cylinder injection type internal combustion engine 1 has not been cold-started. Accordingly, the steps S31~S35, or S51 are executed. These steps will be described in detail later.

If decision is made that the coolant temperature is equal to or lower than 60° C., the step S21 is reached. At this time, decision is that the cylinder injection type internal combustion engine 1 has been cold-started. Accordingly, the fast idle control is executed on the basis of the procedure described as follows.

In the step S21, the variable valve timing mechanism (not shown) sets the time of opening the intake valve 9 to the value equal to the valve opening time mapped and stored in the ROM in the ECU 27. In this embodiment, the valve opening time is set to 25 degrees after the top dead center on the intake stroke. Then, in the step S22, the control of fuel injection is executed. In this case, the injection timing and the injection duration mapped and stored in the ROM in the ECU 27 are corrected in reference to the corresponding values obtained from the respective sensors. As a result, drive current is supplied to the fuel injector 6, and the fuel pressurized by the fuel pump is sprayed into the combustion chamber 11 on the intake stroke.

Now, the control routine proceeds to the step S23, where the ignition timing mapped and stored in the ROM in the ECU 27 is selected to fire the spark plug 5.

Figure 9:
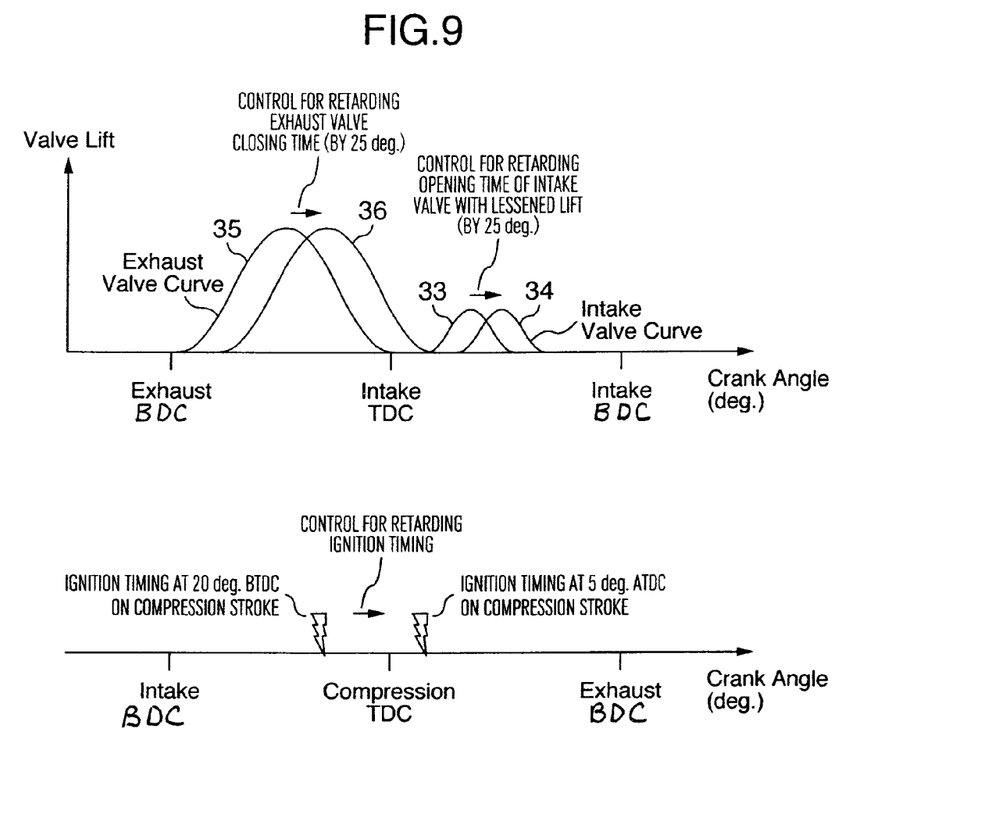
FIG. 9 graphically illustrates an example of the transitional control of the intake valve opening time and the exhaust valve closing time in the case of the cold start of the engine.

The step S24 is then reached, where the transitional control of the intake opening time and the exhaust valve closing time is executed. The step S24 will be described later in reference to FIGS. 9 and 10. The intake valve lift curve 33 in FIG. 9 is the same as those set in the step S13 and S21. The time of closing the exhaust valve 10 is so set as shown with the exhaust valve lift curve 35 representing the top dead center on the intake stroke. From this state onward, the variable valve timing mechanism gradually retards, while correcting, the intake valve opening time and the exhaust valve closing time on the basis of the coolant temperature, the exhaust gas temperature and the catalyst temperature which all rise with the time lapsing after the start of the engine. In this embodiment, the retarded angle position of the intake valve opening time is set to 50 degrees after the top dead center on the intake stroke, and the intake valve lift curve 33 for the intake valve opening time, representing 25 degrees after the top dead center on the intake stroke is shifted to the position of the intake valve lift curve 34 for the intake valve opening time, representing 50 degrees after the top dead center on the intake stroke. Also, the retarded angle position of the exhaust valve closing time is set to 25 degrees after the top dead center on the intake stroke, and the exhaust valve lift curve 35 for the intake valve closing time, representing the top dead center on the intake stroke is shifted to the position of the exhaust valve lift curve 36 for the valve opening time, representing 25 degrees after the top dead center on the intake stroke.

Figure 10:
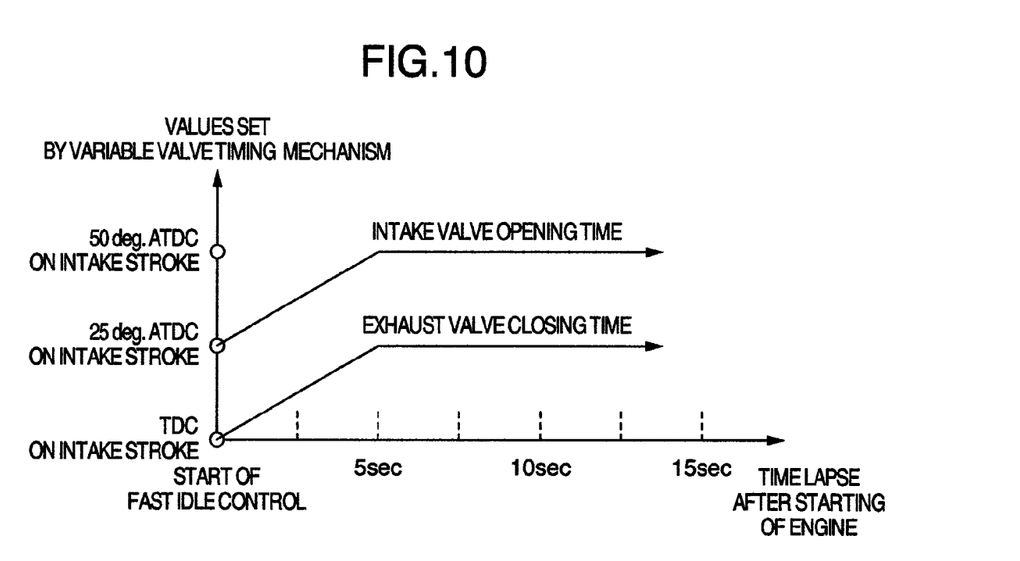
FIG. 10 graphically shows the changes with time lapse in the intake valve opening time and the exhaust valve closing time in the case of the cold start of the engine.

FIG. 10 graphically shows in a rectangular coordinate system the changes with time in the intake valve opening time and the exhaust valve closing time, with the abscissa representing the time lapse after the start of fast idle control and the ordinate representing the values indicating the intake valve opening time and the exhaust valve closing time, set by the variable valve timing mechanism.

In cold starting, the generation of HC is considerable due to the adhesion of fuel to the cylinder bore surface or the top surface of piston head since those surfaces are not yet hot enough. Accordingly, the adhesion of fuel to the cylinder surface is suppressed by lessening the lift amount of the intake valve and retarding the valve opening time, and also the stability of combustion is improved by promoting the vaporization of fuel. However, since too strong intake air flow result in an increase in the adhesion of fuel to the top surface of the piston head, the time of opening the intake valve cannot be retarded to a great extent (e.g. 50 deg ATDC). Also, immediately after the cold start of the engine, the temperatures of the walls of the combustion chamber 11 and the exhaust pipe 8 are low so that a large quantity of heat is lost across those walls. As a result, the effect of elevating the temperature of the combustion chamber 11 by sucking back the residual gas into the combustion chamber 11 through the retarded closure of the exhaust valve 10 may sometimes be small, that is, the effect of suppressing the adhesion of fuel to the top surface of the piston head may sometimes be small. Whereas the temperature of the combustion chamber 11 made up of the cylinder bore and the piston head rises gradually with time lapse from the start of the fast idle control of the engine onward, the catalyst takes much time until it becomes hot enough since it is located downstream of the exhaust pipe 28. There is a well-known technique for early warming-up of catalyst, according to which the time of firing the spark plug is retarded and the fuel charge is subjected to oxidizing reaction not only in the combustion chamber 11 but also in the exhaust pipe 8, so that the temperature of exhaust gas is elevated. With this conventional technique, however, the retarded ignition timing of spark plug causes the unstable combustion of fuel charge, the generation of HC increases, or miss fire occurs to result in the decrease in the rotational speed of the engine and the degradation of exhaust gas. In order to suppress the unstable combustion of fuel charge due to the retarded ignition timing, the time of opening the intake valve 9 is gradually retarded with time lapse from the start of the engine as shown in FIGS. 9 and 10. In this embodiment, during the period of 5 seconds after the start of the fast idle control, both the exhaust valve closing time and the intake valve opening time are gradually retarded up to 25 degrees. Accordingly, the retarded opening of the intake valve can cause the increase in the velocity of the intake air flow, the increased velocity of the intake air flow can promote the blending of the fuel charge, and the stability of combustion can therefore be improved. Namely, even if the ignition timing is retarded, the unstable combustion of fuel charge can be suppressed since the velocity of the intake air flow is further increased by retarding the valve opening time, and therefore the stability of combustion is secured by promoting the blending of the fuel charge.

On the other hand, since the flow of intake air toward the piston head becomes strong as a result of the retarded opening of the intake valve, the amount of the adhesion of fuel onto the top surface of the piston head becomes large. With the engine heated up sufficiently, however, the temperatures of the combustion chamber 11 and the exhaust pipe 8 are also high enough so that the quantity of heat lost across the walls thereof becomes small. Consequently, residual gas at high temperatures can be sucked back into the combustion chamber 11 by retarding the exhaust valve closing time. Thus, the elevation of the temperatures of the cylinder and the piston promotes the vaporization of the fuel injected into the combustion chamber, with the result that the amount of the adhesion of fuel onto the top surface of the piston head is decreased and that the generation of HC can be remarkably suppressed.

In this embodiment, the gradual control of retarding the intake valve opening time and the exhaust valve closing time mapped and stored in the ROM of the ECU 27 is in such a manner that those times are retarded by 25 degrees for 5 seconds. However, since the warming-up of the combustion chamber 11 proceeds with the operating time of the engine, the intake valve opening time and the exhaust valve closing time may be controlled in reference to the data obtained from the respective sensors installed for detecting the condition of the warming-up of the engine. For example, if decision is made that the warming-up of the combustion chamber 11 takes a lot of time, the rate of retarding the intake valve opening time and the exhaust valve closing time may be decreased to 25 degrees for 10 seconds.

When decision is made in the step S14 that the coolant temperature is higher than 60° C., the step S31 is reached, where decision is made on whether or not the warming-up of the catalyst is necessary, on the basis of the temperature value obtained from the catalyst temperature sensor 32 installed on the catalyst 31. If the warming-up of the catalyst is not necessary, the step S51 is reached, where the idling process is executed. These steps occur as when the engine is restarted immediately after it stopped operation.

Figure 11:
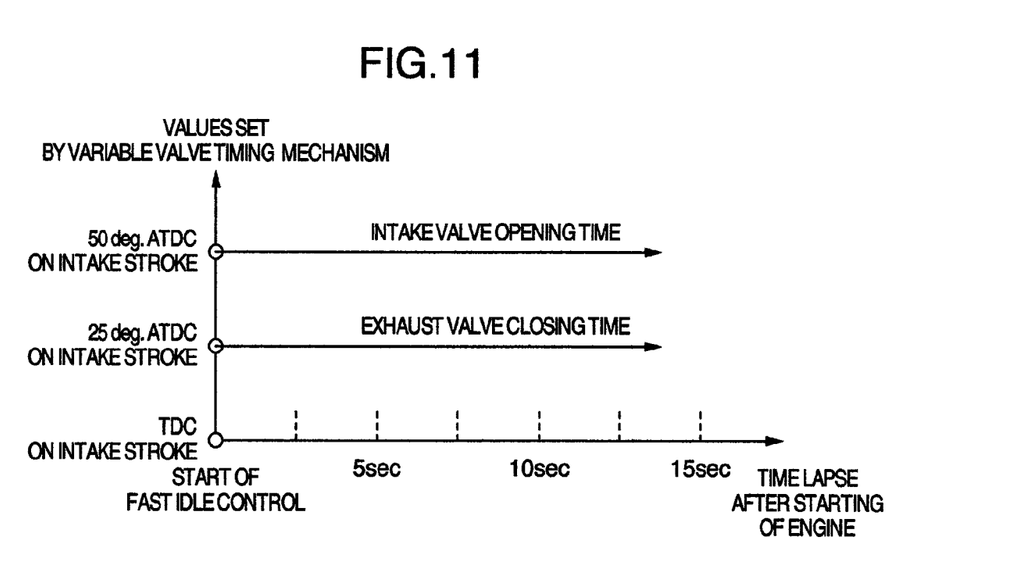
FIG. 11 graphically shows the transitional control on the intake valve during the period of catalyst warming-up.

When decision is made in the step S31 that the warming-up of the catalyst is necessary, the step 32 is reached, where the catalyst warming-up control as shown in FIG. 11 is executed. The settings of the intake valve 9 and the exhaust valve 10 shown in FIG. 11 correspond respectively to the intake valve lift curve 34 and the exhaust valve lift curve 36 shown in FIG. 1. In the step S32, the intake valve opening time is set retarded at 50 degrees after the top dead center on the intake stroke whereas, in the step S33, the exhaust valve closing time is set retarded at 25 degrees after the top dead center on the intake stroke. The intake valve opening time and the exhaust valve closing time are fixed at the respective retarded position until the warming-up of the catalyst has been completed. Then, in the steps S34 and S35, the fuel injection control and the ignition timing control both mapped and stored in the ROM of the ECU 27 are executed. The ignition timing is also retarded with respect to that during the usual idling time immediately after the warming-up of the catalyst.

In all the control routines including the executions of the retardation control for ignition timing, intake valve opening time and exhaust valve closing time, the temperature of the catalyst 31 is continuously monitored by the catalyst temperature sensor 32; the control routines are finished when the monitored temperature reaches the temperature high enough to activate the catalyst 31; and the same idling process control as in the step S51 is executed.

In this embodiment, the gradual control of retarding the intake valve opening time is set in the same manner as the gradual control of retarding the exhaust valve closing time. However, the rates of retarding the intake valve opening time and the exhaust valve closing time may be differently set at 25 degrees for 10 seconds and 25 degrees for 5 seconds, respectively.

Figure 12:
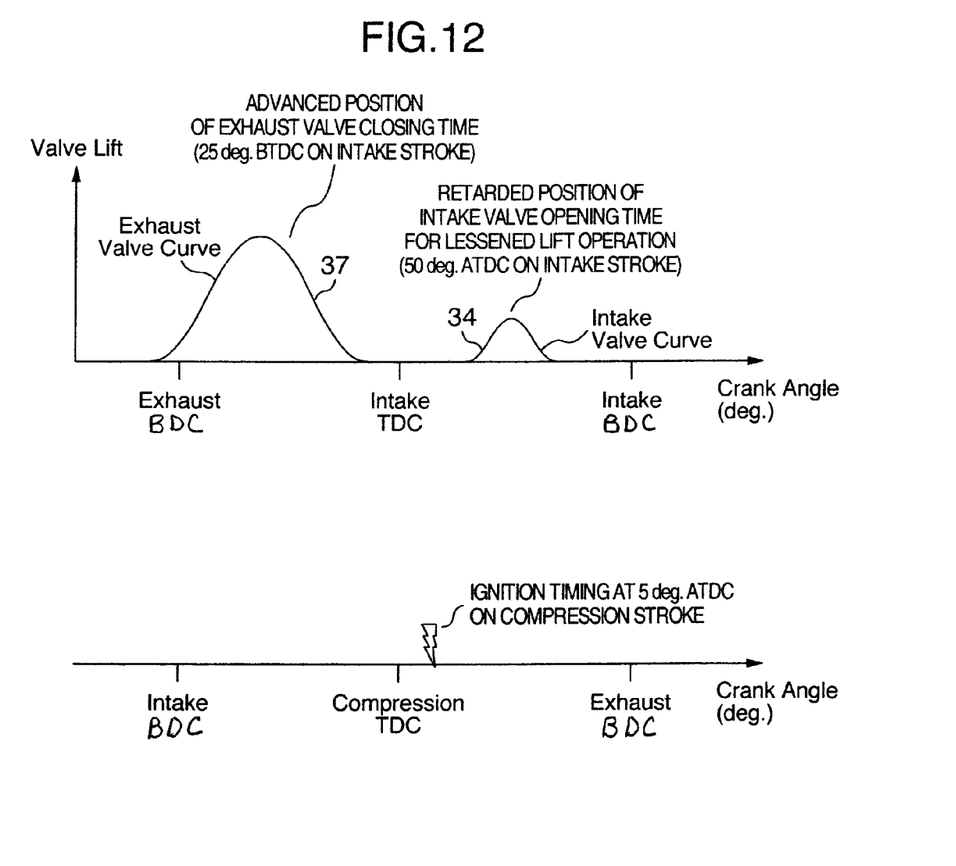
FIG. 12 graphically illustrates another example of the transitional control of the intake valve opening time and the exhaust valve closing time in the case of the cold start of the engine.

FIG. 12 shows an example of the second mode in practice of this invention, in which the same advantage as described above can be obtained by closing the exhaust valve earlier than the top dead center on the intake stroke. The time of closing the exhaust valve 10 is set at the advanced angle position earlier than the top dead center on the intake stroke and the residual gas is sucked back into the combustion chamber 11. At this time, all the burned gas is not discharged, but some is left in the combustion chamber 11 so as to elevate the temperature of the combustion chamber 11. In this case, the burned gas contained in the combustion chamber 11 is not well blended as compared with the case where the valve closing time is retarded as represented with the exhaust valve lift curve 36 in FIG. 7. Accordingly, the reaction of oxidizing HC cannot be promoted and the elevation of the temperature of the combustion chamber 11 is small as compared with that attained in the case where the closure of the exhaust valve is retarded. However, as compared with the case where the residual gas is not sucked back into the combustion chamber 11, this case can still keep the combustion chamber 11 at high temperatures so that the vaporization of fuel can be promoted to some extent and that the amount of fuel adhering to the top surface of the piston head can be remarkably suppressed.

Figure 13:
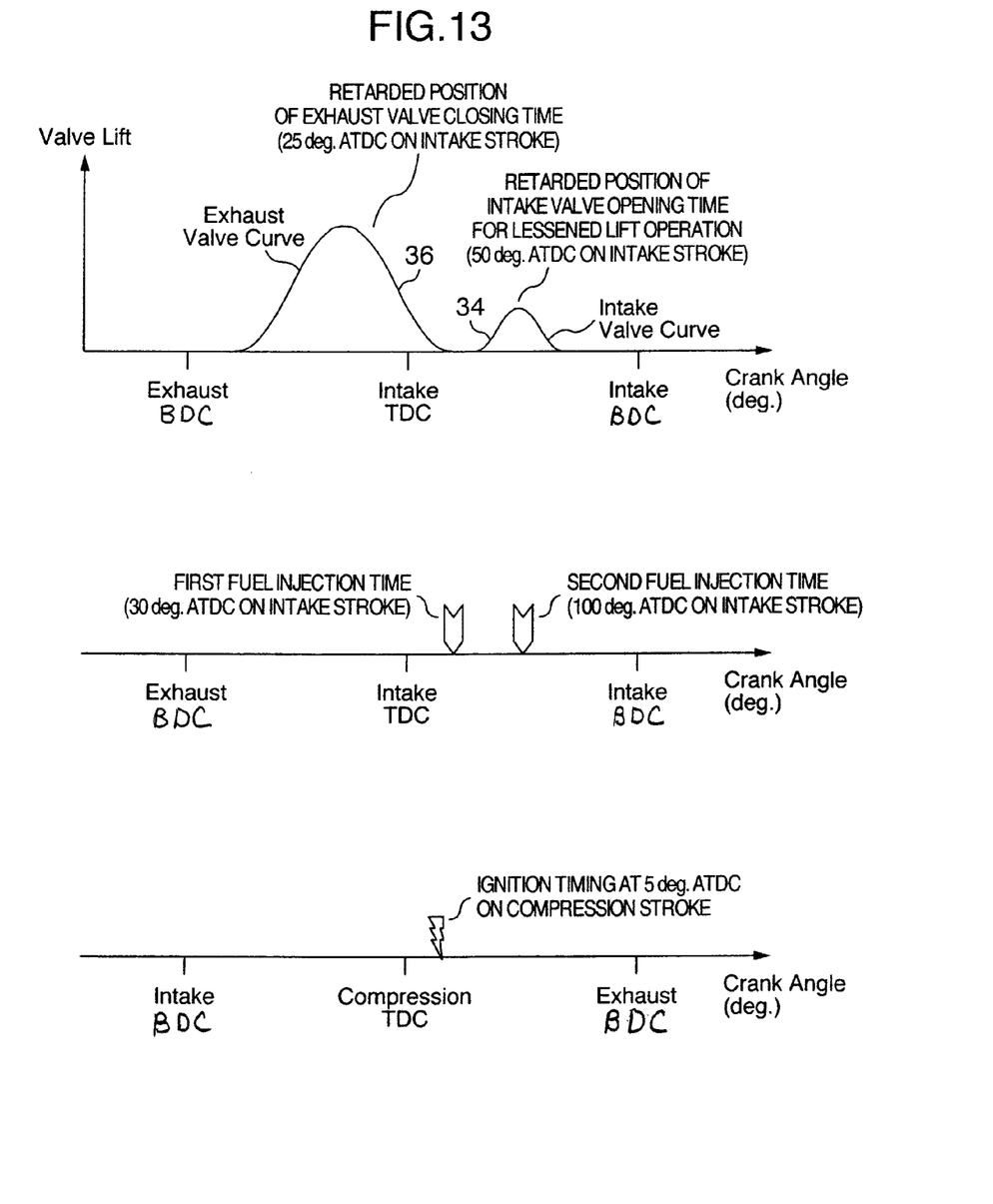
FIG. 13 graphically illustrates how the multi-stage injection control is executed in the case of the cold start of the engine, with the intake valve opening time and the exhaust valve closing time being retarded.

FIG. 13 shows an example of the third mode in practice of this invention, in which, while the intake valve opening time and the exhaust valve closing time are retarded, fuel injection during the intake stroke takes place plural times, not at once, that is, multi-stage injection control is executed, the intended amount of single injection being divided into the separate amounts of plural injections. When the multi-stage injection control is performed, fuel is injected several times before and after the opening of the intake valve. The injection of fuel before the opening of the intake valve can prevent the high-temperature residual gas from being cooled by intake air otherwise flowing into the combustion chamber 11 so that the vaporization of the injected fuel can be remarkably promoted. Due to the divided injections, the amount of fuel injected after the opening of the intake valve is smaller as compared with that for a single injection so that the amount of fuel adhering to the piston can be remarkably suppressed.

Figure 14:
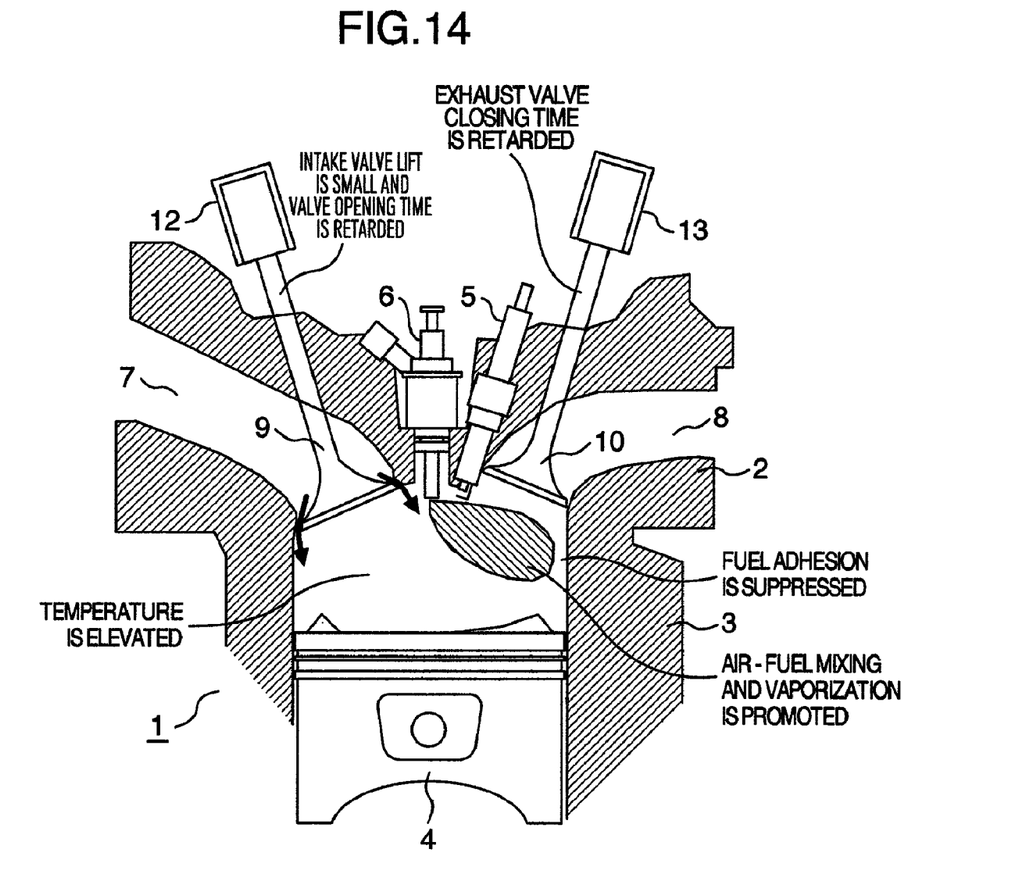
FIG. 14 shows in cross section a cylinder top injection type internal combustion engine in order to explain the behavior of fuel in the cylinder in case where the intake valve lift is lessened, the intake valve opening time is retarded, and the exhaust valve closing time is retarded.

FIG. 14 shows an example of the fourth mode in practice of this invention. This is an embodiment of the center injection type (or cylinder top injection type) internal combustion engine wherein the fuel injector 6 is installed in the upper center of the combustion chamber 11 and the spark plug 5 is installed in the vicinity of the fuel injector 6, as shown in FIG. 14. With this structure along with the operational feature that the lift of the intake valve 9 is lessened while the time of opening the intake valve 9 is retarded, the resulted enhanced flow of the intake air causes the injected fuel to be drifted toward and to adhere onto, the surface of the cylinder wall, not the top surface of the piston head. However, by retarding the exhaust valve closing time and sucking back the residual gas into the combustion chamber, the adhesion of fuel to the surface of the cylinder wall can be suppressed so that the stability of fuel combustion can be improved while the generation of HC can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of controlling a cylinder injection type internal combustion engine in which fuel is supplied directly into a combustion chamber by a fuel injection apparatus situated adjacent to an intake valve, wherein during a fast idle period of the engine, said method comprises:

controlling the fuel injection apparatus to inject fuel on an intake stroke;

setting a lift of the intake valve that is less than a lift of the intake valve that is set when the engine is operating in a heavy load;

setting a start of an opening timing of the intake valve to a point that coincides substantially to a fuel injection timing and is on a retard angle side relative to top dead center of the intake stroke; and controlling a closing timing of an exhaust valve to a point that is on said retard angle side relative to top dead center of the intake stroke, and is before said start of said opening timing of the intake valve, such that burned fuel gas is sucked back into the combustion chamber;

wherein said intake valve opening timing and said exhaust valve closing timing are gradually retarded during an initial operation of said engine from a cold start initial timing to 25 degrees past the cold start initial timing.

2. The method as claimed in claim 1, wherein the closing timing of the exhaust valve is determined based on opening timing of the intake valve.

3. The method as claimed in claim 1, wherein the fuel injection apparatus injects fuel into the combustion chamber at a plurality of separate times, before and after opening of the intake valve.

4. The method according to claim 1, wherein, after starting of the fast idle period:

the opening timing of the intake valve is gradually retarded; and the closing timing of the exhaust valve is gradually retarded or advanced.

5. The method according to claim 1, wherein the opening timing of the intake valve is set to 50 degrees after top dead center of the intake stroke.

6. A method of controlling a cylinder injection type internal combustion engine in which fuel is supplied directly into a combustion chamber by a fuel injection apparatus situated adjacent to an intake valve, wherein during a fast idle period of the engine, said method comprises:

controlling the fuel injection apparatus to inject fuel on an intake stroke;

setting a lift of the intake valve that is less than a lift of the intake valve that is set when the engine is operating in a heavy load;

setting a start of an opening timing of the intake valve to a point that coincides substantially to a fuel injection timing and is on a retard angle side relative to top dead center of the intake stroke; and controlling a closing timing of an exhaust valve to a point that is on an advance angle side relative to top dead center on the intake stroke, such that burned fuel is retained in the combustion chamber;

wherein said intake valve opening timing and said exhaust valve closing timing are gradually retarded during an initial operation of said engine from a cold start initial timing to 25 degrees past the cold start initial timing.

7. The method according to claim 1, wherein said start of an opening timing of the intake valve is set to approximately 50 degrees after top dead center of said intake stroke.

8. The method according to claim 7, wherein said closing timing of said exhaust valve is set to a point that is approximately 25 degrees after top dead center of said intake stroke.

* * * * *